(12) United States Patent
Quoc et al.

(10) Patent No.: US 8,370,349 B2
(45) Date of Patent: Feb. 5, 2013

(54) INSTANT CONTACT SEARCHING AND PRESENTATION BY CATEGORY

(75) Inventors: Michael Quoc, San Francisco, CA (US); Daniel James Wascovich, San Francisco, CA (US); Edward Ho, San Jose, CA (US); Edward Stanley Ott, IV, Palo Alto, CA (US); Jonathan James Trevor, Santa Clara, CA (US); Matthew Fukuda, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 649 days.

(21) Appl. No.: 11/712,855

(22) Filed: Feb. 28, 2007

(65) Prior Publication Data
US 2008/0208812 A1   Aug. 28, 2008

(51) Int. Cl.
*G06F 7/00* (2006.01)
*G06F 17/00* (2006.01)
*G06F 17/30* (2006.01)

(52) U.S. Cl. ............... 707/732; 707/710; 707/737
(58) Field of Classification Search .......... 715/863; 345/173; 455/556.1
See application file for complete search history.

(56) References Cited

U.S. PATENT DOCUMENTS

| | | | |
|---|---|---|---|
| 5,333,317 | A | 7/1994 | Dann |
| 5,923,848 | A | 7/1999 | Goodhand et al. |
| 6,201,814 | B1 | 3/2001 | Greenspan |
| 6,208,339 | B1 | 3/2001 | Atlas et al. |
| 6,247,043 | B1 | 6/2001 | Bates et al. |
| 6,269,369 | B1 | 7/2001 | Robertson |
| 6,377,965 | B1 | 4/2002 | Hachamovitch et al. |
| 6,421,672 | B1 | 7/2002 | McAllister et al. |
| 6,557,004 | B1 | 4/2003 | Ben-Shachar et al. |
| 6,775,689 | B1 | 8/2004 | Raghunandan |
| 6,829,607 | B1 | 12/2004 | Tafoya et al. |
| 6,832,245 | B1 | 12/2004 | Isaacs et al. |
| 6,901,436 | B1 | 5/2005 | Schneider |

(Continued)

FOREIGN PATENT DOCUMENTS

| | | |
|---|---|---|
| JP | 2004126739 A | 4/2004 |
| KR | 10-0564310 B1 | 3/2006 |

(Continued)

OTHER PUBLICATIONS

Federated search, http://en.wikipedia.org/w/index.php?title=Federated_search&oldid=126455262 (last visited May 15, 2007).

(Continued)

*Primary Examiner* — Susan Chen
(74) *Attorney, Agent, or Firm* — Frommer Lawrence & Haug LLP; John W. Branch

(57) ABSTRACT

A device, system, and method are directed towards enabling a mobile device user to perform a federated search across a plurality of disparate contact data stores, including a phone directory, IM store, an email address book, a buddy list, a social networking group, a SMS list, or any of a variety of other communication contact data stores. When a user inputs a character, a dynamic search is performed across the various contact data stores. The results of the search may be repeatedly updated based on additional input characters. The results of the search may be displayed on the mobile device organized by categories of the contact data stores and/or a preferred communication mechanism. The results may also indicate a preferred mechanism for communicating with the displayed name.

22 Claims, 5 Drawing Sheets

U.S. PATENT DOCUMENTS

| | | | |
|---|---|---|---|
| 6,952,805 | B1 | 10/2005 | Tafoya et al. |
| 6,996,413 | B2 | 2/2006 | Inselberg |
| 7,010,572 | B1 | 3/2006 | Benjamin et al. |
| 7,047,030 | B2 | 5/2006 | Forsyth |
| 7,103,379 | B2 | 9/2006 | Hilerio |
| 7,111,044 | B2 | 9/2006 | Lee |
| 7,149,780 | B2 | 12/2006 | Quine et al. |
| 7,162,474 | B1 | 1/2007 | Harker et al. |
| 7,184,790 | B2 | 2/2007 | Dorenbosch et al. |
| 7,240,298 | B2 | 7/2007 | Grossman et al. |
| 7,248,888 | B2 | 7/2007 | Inselberg |
| 7,249,123 | B2 | 7/2007 | Elder et al. |
| 7,313,760 | B2 | 12/2007 | Grossman et al. |
| 7,319,882 | B2 | 1/2008 | Mendiola et al. |
| 7,360,174 | B2 | 4/2008 | Grossman et al. |
| 7,366,759 | B2 | 4/2008 | Trevithick et al. |
| 7,418,663 | B2 | 8/2008 | Pettinati et al. |
| 7,430,719 | B2 | 9/2008 | Pettinati et al. |
| 7,444,351 | B1 | 10/2008 | Nomiyama |
| 7,472,110 | B2 | 12/2008 | Achlioptas |
| 7,512,654 | B2 | 3/2009 | Tafoya et al. |
| 7,516,411 | B2 | 4/2009 | Beaton et al. |
| 7,543,026 | B2 | 6/2009 | Quine et al. |
| 7,543,243 | B2 | 6/2009 | Schwartz et al. |
| 7,577,665 | B2 * | 8/2009 | Ramer et al. ............................ 1/1 |
| 7,580,363 | B2 | 8/2009 | Sorvari et al. |
| 7,596,555 | B2 | 9/2009 | Klein |
| 7,620,387 | B2 | 11/2009 | Rybak |
| 7,631,266 | B2 | 12/2009 | Werndorfer et al. |
| 7,634,741 | B2 | 12/2009 | Klein |
| 7,636,719 | B2 | 12/2009 | Thompson et al. |
| 7,639,634 | B2 | 12/2009 | Shaffer et al. |
| 7,680,770 | B1 | 3/2010 | Buyukkokten et al. |
| 7,684,815 | B2 | 3/2010 | Counts et al. |
| 7,725,523 | B2 | 5/2010 | Bolnick et al. |
| 7,865,206 | B2 | 1/2011 | Quoc et al. |
| 7,873,639 | B2 | 1/2011 | Shipman |
| 8,006,190 | B2 | 8/2011 | Quoc et al. |
| 8,200,763 | B2 | 6/2012 | Quoc et al. |
| 2001/0031632 | A1 | 10/2001 | Benz et al. |
| 2002/0023230 | A1 | 2/2002 | Bolnick et al. |
| 2002/0073163 | A1 | 6/2002 | Churchill et al. |
| 2002/0091773 | A1 | 7/2002 | Chowdhry et al. |
| 2002/0128001 | A1 | 9/2002 | Shuttleworth |
| 2003/0153341 | A1 | 8/2003 | Crockett et al. |
| 2003/0212680 | A1 | 11/2003 | Bates et al. |
| 2004/0001446 | A1 | 1/2004 | Bhatia et al. |
| 2004/0034591 | A1 | 2/2004 | Waelbroeck et al. |
| 2004/0034723 | A1 | 2/2004 | Giroti |
| 2004/0119760 | A1 | 6/2004 | Grossman et al. |
| 2004/0135816 | A1 | 7/2004 | Schwartz et al. |
| 2004/0137882 | A1 | 7/2004 | Forsyth |
| 2004/0167966 | A1 | 8/2004 | Lee et al. |
| 2004/0199580 | A1 | 10/2004 | Zhakov et al. |
| 2004/0210844 | A1 | 10/2004 | Pettinati et al. |
| 2004/0219936 | A1 | 11/2004 | Kontiainen |
| 2005/0021624 | A1 | 1/2005 | Herf et al. |
| 2005/0034079 | A1 | 2/2005 | Gunasekar et al. |
| 2005/0038876 | A1 * | 2/2005 | Chaudhuri .................... 709/219 |
| 2005/0076013 | A1 | 4/2005 | Hilbert et al. |
| 2005/0081059 | A1 | 4/2005 | Bandini et al. |
| 2005/0143106 | A1 | 6/2005 | Chan et al. |
| 2005/0164725 | A1 | 7/2005 | Naito et al. |
| 2005/0174975 | A1 | 8/2005 | Mgrdechian et al. |
| 2005/0177385 | A1 | 8/2005 | Hull et al. |
| 2005/0209914 | A1 | 9/2005 | Nguyen et al. |
| 2005/0212659 | A1 | 9/2005 | Sauer |
| 2005/0216848 | A1 | 9/2005 | Thompson et al. |
| 2005/0267940 | A1 | 12/2005 | Galbreath et al. |
| 2006/0010104 | A1 | 1/2006 | Pettinati et al. |
| 2006/0026535 | A1 * | 2/2006 | Hotelling et al. ............. 715/863 |
| 2006/0059123 | A1 | 3/2006 | Klein |
| 2006/0067250 | A1 | 3/2006 | Boyer et al. |
| 2006/0068818 | A1 | 3/2006 | Leitersdorf et al. |
| 2006/0111135 | A1 | 5/2006 | Gray et al. |
| 2006/0123082 | A1 | 6/2006 | Digate et al. |
| 2006/0195531 | A1 | 8/2006 | Braun et al. |
| 2006/0240856 | A1 | 10/2006 | Counts et al. |
| 2006/0242234 | A1 | 10/2006 | Counts et al. |
| 2006/0250975 | A1 | 11/2006 | Grech et al. |
| 2006/0270419 | A1 | 11/2006 | Crowley et al. |
| 2007/0022003 | A1 | 1/2007 | Chao et al. |
| 2007/0032267 | A1 * | 2/2007 | Haitani et al. ............. 455/556.2 |
| 2007/0047697 | A1 * | 3/2007 | Drewry et al. ............. 379/88.13 |
| 2007/0049344 | A1 | 3/2007 | Van Der Velde et al. |
| 2007/0067285 | A1 | 3/2007 | Blume et al. |
| 2007/0073663 | A1 * | 3/2007 | McVeigh et al. .................. 707/3 |
| 2007/0152978 | A1 * | 7/2007 | Kocienda et al. ............. 345/173 |
| 2007/0197247 | A1 | 8/2007 | Inselberg |
| 2007/0233656 | A1 | 10/2007 | Bunescu et al. |
| 2007/0233681 | A1 * | 10/2007 | Ronen et al. ....................... 707/8 |
| 2007/0255807 | A1 | 11/2007 | Hayashi et al. |
| 2007/0264980 | A1 | 11/2007 | Richardson et al. |
| 2007/0276846 | A1 | 11/2007 | Ramanathan et al. |
| 2008/0045236 | A1 | 2/2008 | Nahon et al. |
| 2008/0071867 | A1 | 3/2008 | Pearson et al. |
| 2008/0120410 | A1 | 5/2008 | Quoc et al. |
| 2008/0186926 | A1 | 8/2008 | Baio et al. |
| 2008/0280637 | A1 | 11/2008 | Shaffer et al. |
| 2011/0072125 | A1 | 3/2011 | Quoc et al. |
| 2011/0302263 | A1 | 12/2011 | Quoc et al. |

FOREIGN PATENT DOCUMENTS

| | | | |
|---|---|---|---|
| WO | 2004095806 | A2 | 11/2004 |
| WO | WO-2005/114970 | A2 | 12/2005 |

OTHER PUBLICATIONS

Crowley, Dennis P. et al., U.S. Appl. No. 60/570,410, filed May 12, 2004 entitled "Location-Based Social Software for Mobile Devices", (18 pages).

Official Communication for Taiwanese Patent Application No. 97100810 issued Sep. 6, 2011.

Official Communication for Korean Patent Application No. 10-2009-701142 mailed Jan. 13, 2011.

Official Communication for Chinese Patent Application No. 200780048985.3 mailed Aug. 25, 2010.

Official Communication for Chinese Patent Application No. 200780048985.3 mailed Dec. 26, 2011.

Official Communication and Search Report for European Patent Application No. 07798558.8 mailed Nov. 18, 2010.

International Search Report and Written Opinion for International Application No. PCT/US2008/050234 mailed Apr. 23, 2008.

International Preliminary Report on Patentability for International Patent Application No. PCT/US2008/050234 mailed Aug. 13, 2009.

International Search Report and Written Opinion for International Patent Application No. PCT/US2007/071204 dated Dec. 7, 2007.

Official Communication for U.S. Appl. No. 11/555,247 mailed Jun. 7, 2010.

Official Communication for U.S. Appl. No. 11/555,247 mailed Oct. 28, 2010.

Official Communication for U.S. Appl. No. 11/555,247 mailed Jan. 4, 2011.

Official Communication for U.S. Appl. No. 11/555,247 mailed Apr. 12, 2011.

Official Communication for U.S. Appl. No. 11/562,827 mailed Jun. 17, 2009.

Official Communication for U.S. Appl. No. 11/562,827 mailed Jul. 20, 2010.

Official Communication for U.S. Appl. No. 11/562,827 mailed Jan. 6, 2010.

Official Communication for U.S. Appl. No. 11/562,827 mailed Feb. 1, 2011.

Official Communication for U.S. Appl. No. 11/562,827 mailed Dec. 8, 2011.

Official Communication for U.S. Appl. No. 11/562,827 mailed Feb. 16, 2012.

Official Communication for U.S. Appl. No. 11/670,400 mailed Aug. 11, 2009.

Official Communication for U.S. Appl. No. 11/670,400 mailed Feb. 4, 2010.

Official Communication for U.S. Appl. No. 11/670,400 mailed Oct. 25, 2010.

Official Communication for U.S. Appl. No. 11/670,400 mailed Apr. 28, 2011.
Official Communication for U.S. Appl. No. 11/688,749 mailed Aug. 27, 2009.
Official Communication for U.S. Appl. No. 11/688,749 mailed May 18, 2010.
Official Communication for U.S. Appl. No. 11/688,749 mailed Jul. 13, 2010.
Official Communication for U.S. Appl. No. 11/688,749 mailed Aug. 30, 2010.
Official Communication for U.S. Appl. No. 12/955,771 mailed Jul. 21, 2011.
"Dodgeball Goes Multi-City," Corante: Tech News. Filtered Daily.; Many2Many: A Group Weblog on Social Software, Apr. 17, 2004, 1 page.
"So Happy Together," Dodgeball.com—Originally published in Newsweek, May 10, 2004, pp. 12-13.
Diehl, C. P. et al., "Name Reference Resolution in Organizational Email Archives," Proceedings of the Sixth SIAM International Conference on Data Mining, Apr. 20-22, 2006; Bethesda, MD.
Malin, B. et al., "A Network Analysis Model for Disambiguation of Names in Lists," Computational & Mathematical Organziation Theory, vol. 11, No. 2, Jul. 2005, pp. 119-139.
Yang, K.-H. et al., "Web Appearance Disambiguation of Personal Names Based on Network Motif," Proceedings of the 2006 IEEE/WIC/ACM International Conference on Web Intelligence, Dec. 18-22, 2006, pp. 386-389.
"Yahoo! Users Can Now Search and Send Email with Four11 Directory," PR Newswire, Apr. 10, 1996, p. 410SFW007.
Bekkerman, R. et al., "Disambiguating Web Appearances of People in a Social Network," Proceedings of the 14th International Conference on World Wide Web, May 10-14, 2005, Chiba, Japan.
Culotta, A. et al., "Extracting Social Networks and Contact Information from Email and the Web," Department of Computer Science, University of Massachusetts, Amherst, MA, 2004; retrieved from http://www2.selu.edu/Academics/Faculty/aculotta/pubs/culotta04extracting.pdf.
Hölzer, R. et al., "Email Alias Detection Using Social Network Analysis," Proceedings of the 3rd International Workshop on Link Discovery, Aug. 21-25, 2005, pp. 52-57, Chicago, Illinois.
Bollegala, D. et al., "Extracting Key Phrases to Disambiguate Personal Names on the Web," Proceedings of the CICLing 2006, 2006, Mexico City, Mexico.
"Disambiguation of Intended E-mail Recipients by Contextual Analysis of E-mail Subject and Body Text," IBM Technical Disclosure Bulletin, No. 450, UK, Oct. 2001, p. 1749, TDB-ACC-No: NNRD450111.
"Ambiguity Memory," IBM Technical Disclosure Bulletin, vol. 36, No. 8, Aug. 1993, US, pp. 229-230; TDB-ACC-No: NN9308229.
"Circle Line: Let your Cell Phone Keep Tabs on Your Friends," Dodgeball.com—Originally published in Time Out NY, No. 247, Dec. 4-11, 2003, pp. 174-175.
"Friendster For Your Mobile Phone," Trandcentral, Apr. 19, 2004, 1 page.
Häkkilä, J. et al., "User Experiences on Combining Location Sensitive Mobile Phone Applications and Multimedia Messaging," In Proceedings of the 3rd International Conference on Mobile and Ubiquitous Multimedia, College Park, Maryland, Oct. 27-29, 2004, MUM 2004, vol. 83 ACM, New York, NY, pp. 179-185.
Event from The American Heritage Dictionary of the English Language, CREDO reference, accessed Jan. 2, 2010, 2 pages, http://www.credoreference.com/entry/hmdictenglang/event.
Event Definition from the Merriam-Webster Online Dictionary accessed Jan. 2, 2010, 2 pages, http://m-w.com/dictionary/event.

* cited by examiner

INSTANT CONTACT SEARCHING AND PRESENTATION BY CATEGORY

FIELD OF THE INVENTION

The present invention relates generally to mobile communications and, more particularly, but not exclusively to performing federated contacts searches across a plurality of contact data stores and presenting the results based on a categorization of sources for a mobile device.

BACKGROUND OF THE INVENTION

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

However, with this technological society comes a myriad of mechanisms available to allow an individual to communicate with another individual. For example, people may select from such mechanisms as Instant Messaging (IM), audio telephone systems, Voice over Internet Protocol (VoIP), Short Messaging Service (SMS), email, Internet Relay Chat (IRC), or the like. Moreover, many of these mechanisms may be implemented using different user interface agents, many of which may employ different ways of managing contact addresses in their contact data stores.

The problem with having so many different mechanisms to communicate with another individual is that it may sometimes be difficult to determine which mechanism to use for a given individual. Moreover, a contact may be stored in address stores using different ways, including using a nickname, an alias, or virtually any other variation imaginable. Thus, it may also be difficult to locate the contact's address within any one of the myriad of address stores. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
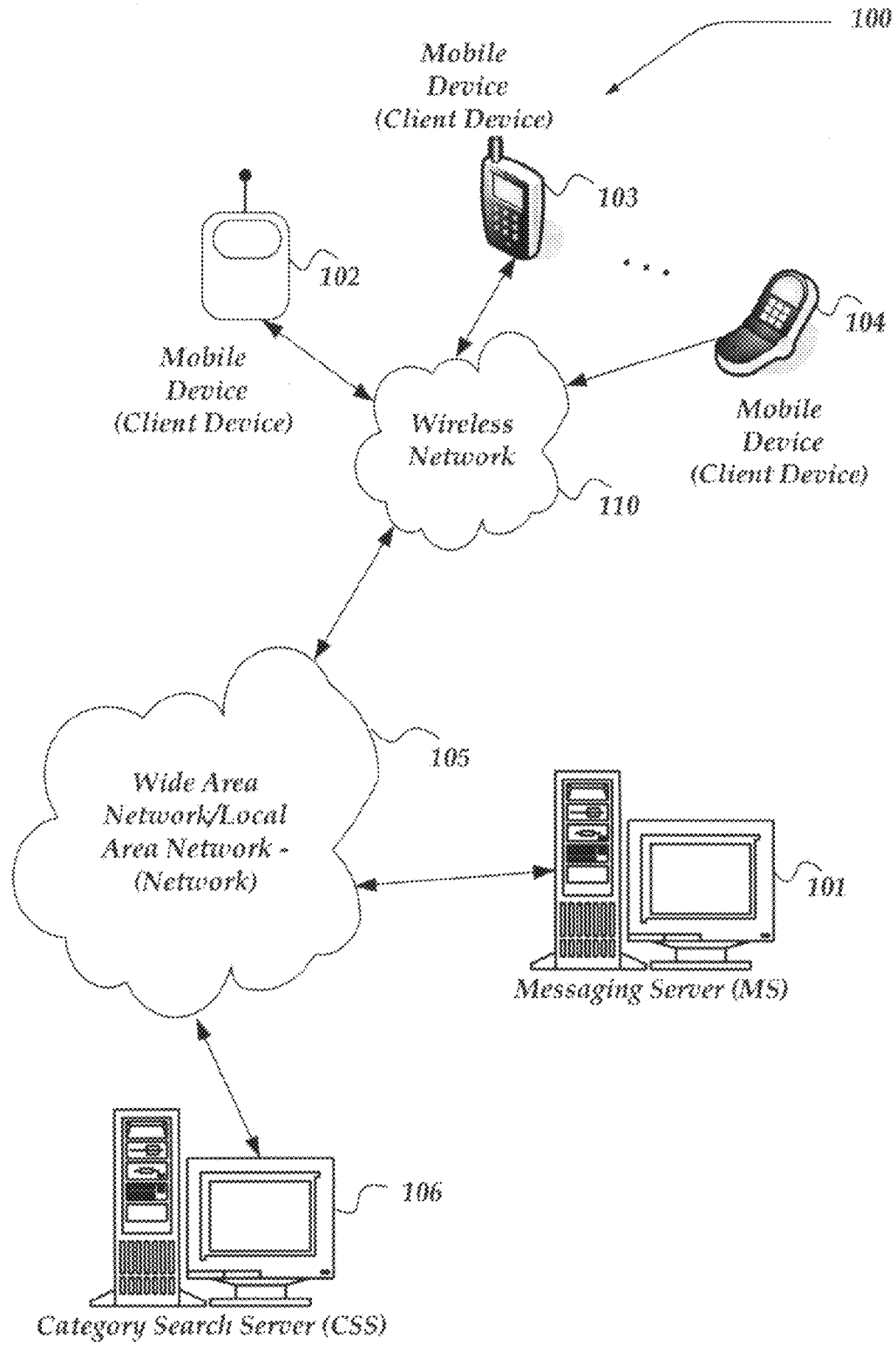
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. Such social network may be created based on a variety of criteria, including, for example, a social event, such as a party, meeting event, or the like. Social networks may be organized using a variety of mechanisms, including buddy lists, email group lists, IM group lists, or the like.

As used herein, the term "federated search" refers to performing a search for content across multiple, independent, data sources, or databases, through one search query.

Briefly stated, the present invention is directed towards a system, method, and apparatus for use in enabling a mobile device user to perform a federated search across a plurality of disparate contact data stores. For example, in one embodiment, the contact data stores may include a phone directory, an Instant Messaging (IM) store, an email address book, a buddy list, a social networking group such as a fishing group list, a poker group, a work group list, a SMS list, or any of a variety of other communication contact stores, and/or communication mediums. Moreover, the contact information within a contact data store may include contact names and addresses, each address being associated with a mode of communication. Thus, the addresses may include SMS addresses, telephone numbers, IM address, email addresses, or the like.

When a user inputs a character for use in initiating a communication, a dynamic federated search is performed across the various contact data stores. In one embodiment, the user may select a set of contact data stores in which to perform the search. In another embodiment, a default set of contact data stores may be employed. The results of the search may be repeatedly updated based on additional input characters. The results display contact names and addresses, where either the contact name or address includes the input characters.

The results of the search may be displayed on the mobile device organized by categories of data stores and/or a preferred communication mechanism. For example, in one embodiment, the results may be displayed based on matches within a contact data store. In another embodiment, the user may define a sorting order, such as a sort based on a most frequently used communication mechanism. For example, where the search user might communicate frequently using IM, the results may be organized with IM results prior to other communication mechanisms. In one embodiment, a result may be color coded to indicate a preferred mechanism for communicating with that user. For example, where SMS is a preferred mechanism for communicating with user B, user B's results contact data might be highlighted, color coded, asterisked, or the like, to indicate the preference. In one embodiment, a preferred mode of communication may be determined based, in part, on the search user receiving communications from the other user more often with one mode of communication than another mode of communication. Thus, if user B sends messages to the search user more frequently using SMS than email, then user B's SMS address might be so identified as a preferred mode for user B.

As the user inputs additional characters, the federated search is dynamically repeated and the displayed list is updated based on the results of the search. The user may then select an address from the displayed list, and automatically initiate a communication with a contact name associated with the address over a communication medium associated with the address.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Category Search Server (CSS) 106, mobile devices (client devices) 102-104, and messaging server (MS) 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that may be configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to CSS 106, MS 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as CSS 106, MS 101, each other, or the like. However, the present invention is not limited to these message protocols, and virtually any other message protocol may be employed. For example, the client application may enable a user to interact with the browser application, email application, VOIP applications, or the like.

Mobile devices 102-104 may further be configured to include a client application that enables the end-user to log into an end-user account that may be managed by another computing device, such as CSS 106, MS 101, or the like. Such end-user account, for example, may be configured to enable the end-user to send and/or receive emails, IM messages, SMS messages, access selected web pages, participate in a social networking event, or the like. However, participation in various social networking events may also be performed without logging into the end-user account.

In addition, mobile devices 102-104 may include another application that may be configured to enable the mobile user to share and/or receive media content, and to display the media content. In one embodiment, each of mobile devices 102-104 may share with and/or receive the media content from CSS 106, MS 101, and/or from another one of mobile devices 102-104. For example, media content may be shared between the mobile devices using MMS, WAP, or the like. In one embodiment, a mobile device may receive a message indicating the media content is available for viewing and/or annotating at a website, or the like.

In conjunction with sharing media content, mobile devices 102-104 may enable an interaction with each other, through sharing various messages, and generally participating in a variety of integrated social experiences beyond merely voice communications. For example, a user of a mobile device may employ various modes of communication, such as IM, email, SMS, or the like, to communicate with others. In one embodiment, the user of the mobile device may elect to store information about the other persons within one or more address books, buddy lists, or other contact data stores. Such information may include the other person's address for a mode of communication, as well as other information about the person. In one embodiment, the user may elect to use an alias, or other short form for a name associated with another person. In one embodiment, the other name may be in different formats, or forms, for different modes of communications. For example, the mobile device user may store John C. Richards' name in one communication contact data store as John C., while in another contact data store, the name may be stored as Richards, J C Richards, or even, under an alias such as J C R, Richy, or any of a variety of other forms. Moreover, the contact data stores may reside within the user's mobile device, and/or on another computing device, such as CSS 106 and/or MS 101.

Mobile devices 102-104 may further be configured to access CSS 106 and request a search for a contact name be performed across one or more of the plurality of communication contact data stores. In one embodiment, mobile devices 102-104 may request and conduct the search using any of a variety of messaging managers that may reside on the mobile device. In another embodiment, mobile devices 102-104 may request and receive a separate interface for search use from CSS 106. In still another embodiment, mobile devices 102-104 may access and employ an application, script, or the like, that resides on CSS 106 to request and perform the search. The search results, however, may be displayed on the requesting mobile device, using any of a variety of display modes, including through a separate application, a web page, a messaging manager, or the like.

Wireless network 110 may be configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 may be configured to couple CSS 106 and its components with other computing devices, including, mobile devices 102-104, MS 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between CSS 106, MS 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

MS 101 may be configured to enable a communication between one or more client devices, using a messaging service, such as email, IM, SMS, VOIP, web services, or other modes of communication.

MS 101 may further include a contact data store that may include one or more contact names with an associated address for use in initiating a communication. Thus, for example, MS 101 may employ an IM buddy list, friends list, or the like for storing contact information. In another example, MS 101 also may manage contact information using one or more email address books, or the like. Moreover, in one embodiment, at least a portion of the contact information from MS 101 is accessible to at least one of client devices 102-104, and/or CSS 106.

MS 101 may further be employed to manage voice communications for various voice communication modes, including, but not limited to PC to PC voice modes, PC-PSTN voice modes, or the like. Similarly, MS 101 may be used to manage instant messaging communications, email messages, and so forth.

MS 101 may be implemented on a variety of computing devices including personal computers, desktop computers, multiprocessor systems, microprocessor-based devices, network PCs, servers, network appliances, or the like. Moreover, although MS 101 is illustrated as a single network device, the invention is not so limited. For example, one or more of MS 101 may also be implemented using a plurality of servers to provide various messaging services. In one embodiment, at some messaging services, and/or contact data stores may reside on CSS 106.

One embodiment of CSS 106 is described in more detail below in conjunction with FIG. 3. Briefly, however, CSS 106 may include any computing device capable of connecting to network 105 to enable a dynamic search to be performed across a plurality of contact data stores based on input of one or more characters from mobile devices 102-104. CSS 106 may perform the search, in one embodiment, upon contact data stores within itself, and/or contact data stores within MS 101. In one embodiment, CSS 106 may also request from mobile devices 102-104 access to and/or receipt of contact data store information within the mobile devices. CSS 106 may then perform the search upon the mobile device contact data stores, as well.

CSS 106 is further configured to enable a display of the results of the search on a requesting mobile device. In one embodiment, the results may be organized based on which contact data store the result item was obtained. For example, in one embodiment, the display might organize the results based on whether it was from an IM contact data store, a buddy list, an email address book, an SMS contact data store, a phone directory list, or the like. In one embodiment, CSS 106, or an application within the mobile device, may annotate various items within the displayed results to indicate whether the contact name displayed prefers a particular mode of communication over another one. Such determination may be based on any of a variety of criteria. For example, CSS 106, MS 101, or the like, may collect data about messages from a mobile device, and use the collected data to rank order the modes of communication based on a frequency of use by the mobile device. In one embodiment, the highest frequency mode might be annotated as a preferred mode of communication with that mobile device. In one embodiment, the rank ordering may be based on a frequency of sending of messages using a given mode of communication. In another embodiment, the rank ordering may be based on a frequency of receiving and/or sending of messages. In one embodiment, the annotation may indicate a preferred mode of communication with searching mobile device. Thus, for example, in one embodiment, the mode used most frequently between the two computing devices, might be indicated. However, the invention is not so limited, and virtually any other criteria may be used to sort the results for display. For example, in one embodiment, the results may be sort ordered alphabetically by contact name, address, or the like, within each contact data store category.

CSS 106 may also be configured to enable the mobile device user requesting the search to select a subset of the plurality of contact data stores in which to perform the search, or employ a default set of contact data stores. CSS 106 may further enable the mobile device user to determine a categorization for the displaying of the results.

Devices that may operate as CSS 106 include personal computers desktop computers, multiprocessor systems, microprocessor-based or programmable consumer electronics, network PCs, servers, and the like.

Although FIG. 1 illustrates CSS 106 as a single computing device, the invention is not so limited. For example, one or more functions of CSS 106 may be distributed across one or more distinct computing devices. For example, managing various social networking events, enabling a federated search across disparate contact data stores, managing Instant Messaging (IM) sessions, SMS messages, email messages, managing user-accounts, or the like, may be performed by a plurality of computing devices, without departing from the scope or spirit of the present invention.

Moreover, it should be clear that the various contact data stores managed by CSS 106, and/or MS 101 may also include information about contacts that employ other than a mobile device. Thus, the contact information may include contact names and associated addresses for land based telephones, desktop computers, or the like, without departing from the scope of the invention.

Illustrative Mobile Client Environment

Figure 2:
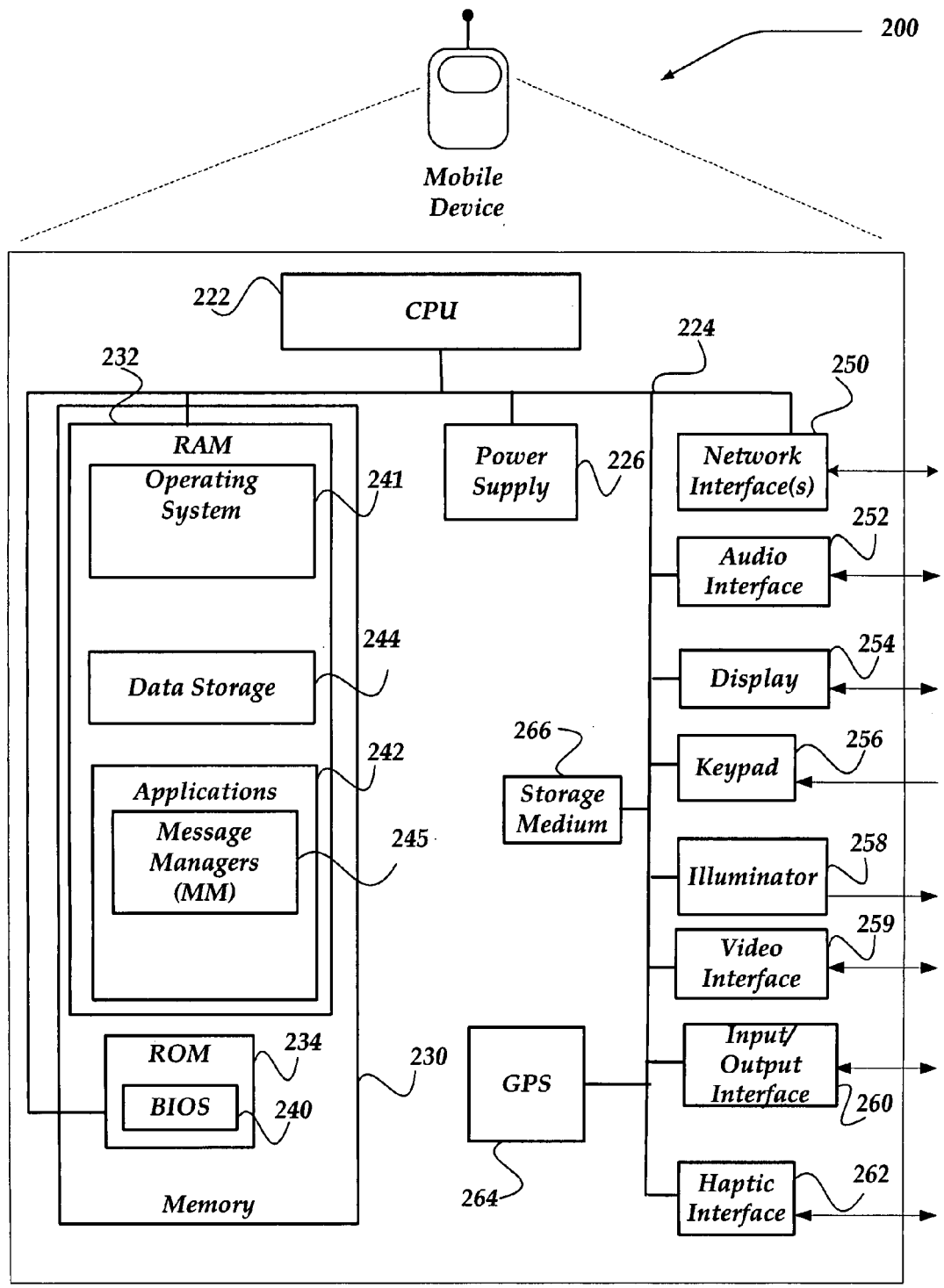
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store text messages, address books, group member lists, buddy lists, IM lists, SMS lists, or the like. At least a portion of the contact information may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Managers (MM) 245.

MM 245 represents any of a variety of applications configured to transmit, receive, and/or otherwise process messages and other network content, including, but not limited to SMS, MMS, IM, email, VOIP, HTTP/HTTPS, or the like, and to enable telecommunication with another user of another networked device. For example, MM 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MM 245 may include an email application configured to enable access to an email server in a local or remote network. Also known as an "e-mail messaging client application," "mail client," "mail program," and "mail reader," MM 245 may provide the ability to send and receive e-mail messages and a file attachment using a variety of communication protocols, including but not limited to Post Office Protocol (POP), Internet Message Access Protocol (IMAP), Simple Mail Transfer Protocol (SMTP), or the like. In one embodiment, MM 245 may also employ Multipurpose Internet Mail Extensions (MIME) for use in transmitting non-text files over a network. MM 245 thus provides for an email communication medium. Moreover, MM 245 may be a stand-alone program, or a messaging client application configured within a browser application, or the like.

In one embodiment, MM 245 may manage an address book that includes contact information such as contact names and associated email addresses. However, MM 245 may also manage contact information in another mechanism, including, for example, an email history log, or the like. In one embodiment, a contact name may have more than one email address associated with it. In one embodiment, the address book is stored and managed local to mobile device 200. In another embodiment, at least a portion of the address book is located on a network server.

MM 245 may also be configured to include an application to enable mobile device 200 to initiate, receive, and manage a VOIP session with another client device. MM 245 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, Megaco, MGCP, MiNET, Skinny Client Control Protocol (SCCP), or the like. MM 245 is further configured to employ virtually any media codec to compress the media stream for communicating it over the network, including G.711, G.729, G.729a, iSAC, Speex, and the like. In one embodiment, SIP may be employed to enable a Session Description Protocol (SDP).

In one embodiment, MM 245 may also store and manage a voice call log, or the like. The voice call log, or the like, may include various contact information including a contact name and an associated address. The address may include a telephone number, MSIDSN, MIN, a network address such as an IP address, or the like. In one embodiment, at least a portion of the voice call log, address book, or the like, may be stored on a network server.

MM 245 may also include applications that enable standard voice calls to be performed using wireless communication networks. In one embodiment, MM 245 may also store and manage voice call logs, address books, or the like, associated with this mode of communication. In one embodiment, the address bocks, call logs, or the like, may be stored on a network server.

MM 245 may also include an application that may be configured to initiate and manage an instant messaging (IM) session. MM 245 may include but not be limited to such messaging client applications as AOL Instant Messenger, Yahoo! Messenger, .NET Messenger Server, ICQ, or the like. In one embodiment, MM 245 may employ SIP to establish media sessions with another computing device employing an IM/VOIP capable client, and RTP to communicate the media traffic. However MM 245 is not so limited. For example, MM 245 may also employ any of the following: SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MM 245 may also include other text messaging application(s) that enables mobile device 200 to receive and/or send text messages to another device. In one embodiment, the text messaging application(s) may also provide an alerting mechanism that indicates to a user of mobile device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other media content may be communicated between mobile device 200 and another networked device.

Moreover, MM 245 may be configured to store and manage contact information useable to employ text messaging applications. In one embodiment, the contact information is managed within a buddy list, an IM friends list, IM conversation history log, or the like, that may be stored locally on mobile device 200. In one embodiment, some or all of the IM contact information may also be stored on a network server. It should be noted, MM 245 is not limited to the modes of communication, and/or communication applications described above, and virtually any mode of communication that may employ a contact data store may be included, whether the contact data store is stored on mobile device 200, in whole, or in part, or stored on another network device, in whole, or in part.

MM 245 may, in any event, include an application that enables mobile device 200 to request and have performed a search across one or more of a plurality of contact data stores, where the contact data stores may reside on mobile device, and/or on another networked device. MM 245 may further include one or more applications configured to receive the result and to display the result based on a category of contact data stores from which the result was obtained, or virtually any other category. MM 245 may also be configured to display an identifier indicating a preferred mode of communication for a result item.

Illustrative Server Environment

Figure 3:
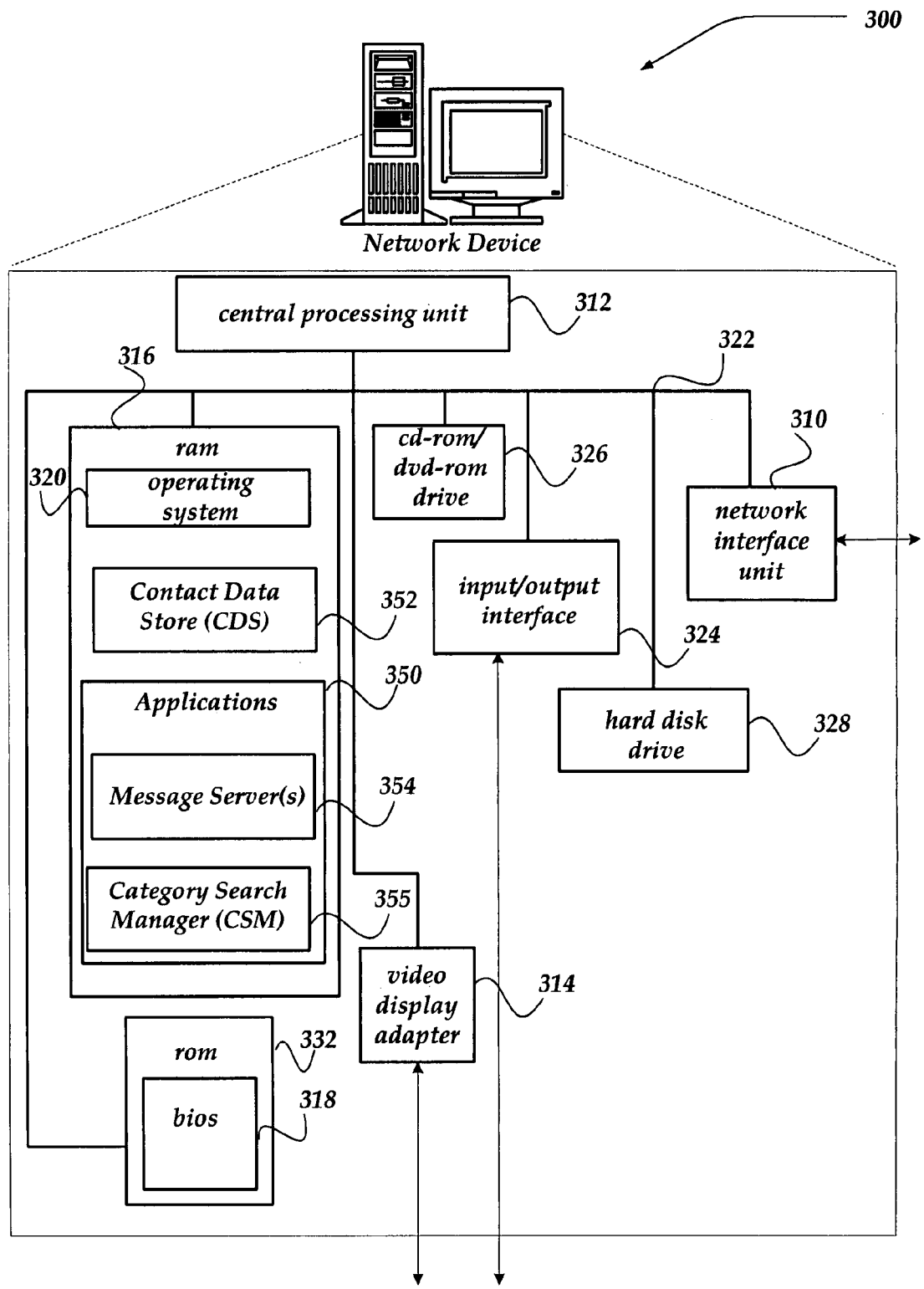
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, CSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, account management, and so forth. Category Search Manager (CSM) 355, and/or Message Servers 354 may also be included as application programs within applications 350. Mass memory may also include Contact Data Store (CDS) 352.

CDS 352 may include a database, text, spreadsheet, folder, file, or the like, that may be configured to maintain and store contact information including a contact name and at least one address associated with the contact name. The contact name may include an alias, a user name, or the like. The address may include an email address, an IM address, SMS address, a telephone number, ESN, MIN, or the like. Each address may be associated with a mode of communication as described above. Thus, for example, an email address may be associated with an email mode of communication, while a telephone number may be associated with a PC to PC voice mode, PC to PSTN voice mode, or the like. In one embodiment, a contact name may have multiple addresses associated with a mode of communication. Moreover, in one embodiment, a contact name may have multiple addresses, at least two addresses being associated with different modes of communication.

In one embodiment, the contact information within CDS 352 is partitioned in a manner such that at least a portion of the contact information is associated with one user of a client device, while another portion of the contact information is associated with another user of another client device. In one embodiment, a portion of the contact information may be inaccessible to at least one user, while accessible to another user.

Moreover, based at least in part, on a type of messaging service, CDS 352 may include an IM friends list, a buddy list, an email address book, email history log, an IM conversation log, a VOIP store, or the like.

Messaging service (MS) 354 may be configured to manage a communications between one or more users using various communication mediums. MS 354 represents any of a variety of messaging services, including, but not limited to email server applications, IM server applications, SMS server applications, VOIP server applications, or the like. Moreover, although a single MS 354 is illustrated, the invention is not so limited, and network device 300 may include one or more messaging services, without departing from the scope or spirit of the invention.

In one embodiment, MS 354 may be configured to manage communications using a variety of communication mediums. In one embodiment, at least one application within MS 354 may be configured to manage a communication using a single communication medium. MS 354 may also be configured to employ contact information within CDS 352 to enable a communications.

In one embodiment, MS 354 may enable a client device to access at least a portion of the contact information within CDS 352. For example, in one embodiment, when a client device establishes a connection with network device 300, MS 354 may provide at least a portion of the contact information to the client device. In one embodiment, the contact information may also be provided to the client device based on a request for the information, or the like.

MS 354 may also be configured to update contact information within CDS 352 based on a communication between two or more client devices, a request to modify the contact information received from a client device, or even based on a history log, or the like, received from a client device, or another network device, or the like. Thus, in one embodiment, MS 354 may also provide updated contact information to a client device, based at least in part, on the occurrence of the update.

CSM 355 may be configured to receive a request for a search across one or more of a plurality of contact data stores, and to provide a result of the search to a requesting device. In one embodiment, the requesting device is a mobile device, such as illustrated in FIG. 1.

CSM 355 may perform the search across local contact data stores, such as CDS 352, and/or across one or more data stores residing on one or more different computing devices. In one embodiment, one or more of the contact data stores may be associated with a different mode of communication. Thus, in one embodiment, one contact data store may be associated with IM communications, while another contact data store may be associated with email, SMS, voice phone, or the like. In one embodiment, CSM 355 may receive information indicating that the search is to be performed across a specified subset of the plurality of contact data stores. In another embodiment, CSM 355 may employ a default set of contact data stores with which to perform the search.

CSM 355 may receive at least one character from a mobile device, where the at least one character is associated with the search. CSM 355 may perform the search across the contact data stores to locate a match based on the at least one character, where the at least one character may reside within a contact name, and/or an address. In one embodiment, the at least one character may reside anywhere within the contact name and/or address. Typically, the at least one characters are contiguous within the contact name and/or address, however, the invention is not so limited. Thus, for example, if the search is for "abe," the following contact names might be determined to match: "Alice Becomings," "Cabe Richards," or the like. In one embodiment, the search may be performed each time another character is received from the mobile device.

Figure 5:
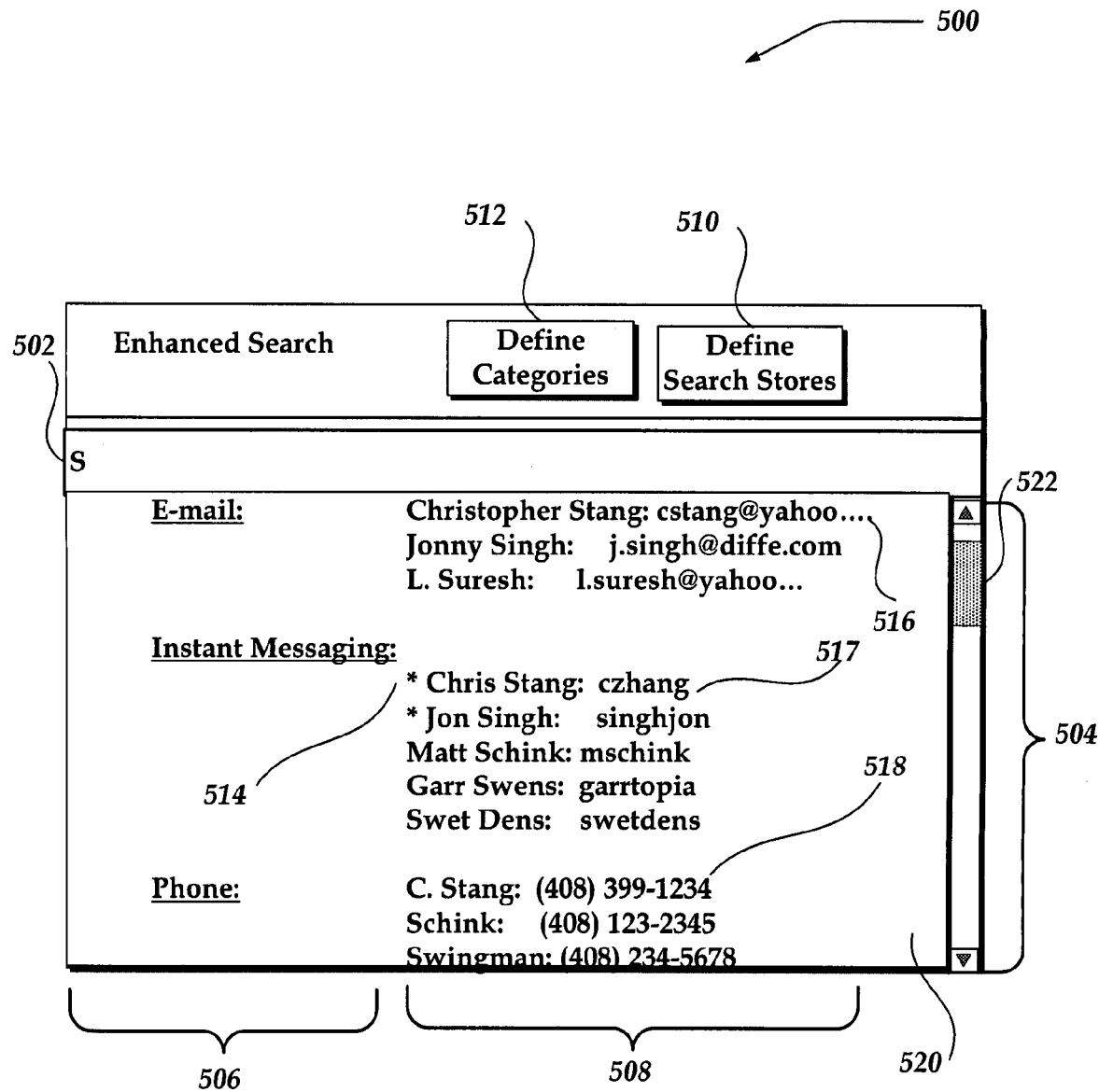
FIG. 5 shows one embodiment of a screen shot illustrating a federated contact search and presentation by category of results on a mobile device, in accordance with the present invention.

CSM 355 may then provide a display of the search results, and may revise the display each time another search is performed. In one embodiment, the results may be displayed ordered based on categories that indicate the contact data store source. For example, if the search result is from an IM buddy list, the display may provide the results so indicating this. One embodiment, of a search result displayed using contact data stores as categories is shown in FIG. 5.

In one embodiment CSM 355 for obtain from a variety of mechanisms, information indicating a preferred mode of communication for a search result contact name. In one embodiment, the preferred mode of communication may be identified through an icon, highlighting, underlining, or any of a variety of other ways. Such information regarding preferences may be obtained from message servers 354, CDS 352, the mobile device, or a variety of contact data stores, and/or message services residing on remote servers.

A mobile device user may continue to provide more characters for another search. As more characters are received, in one embodiment, an auto-completion of the contact being searched for may be attempted, based on the search results. For example, a contact name or address that most closely matches the characters employed in the search may be displayed in a field where the search characters are entered on the mobile device. Where there might be several results that match the characters, a first result might be used to auto-complete the display field on the mobile device.

Moreover, while the user may continue to provide characters, the user may also select an address from the displayed results. When an address is selected, CSM 355 may enable the mobile device to initiate a communication to the associated contact name using the mode of communication associated with the selected address. In one embodiment, CSM 355 may employ a process similar to process 400 described below in conjunction with FIG. 4, to perform at least some of its actions.

Generalized Operation

Figure 4:
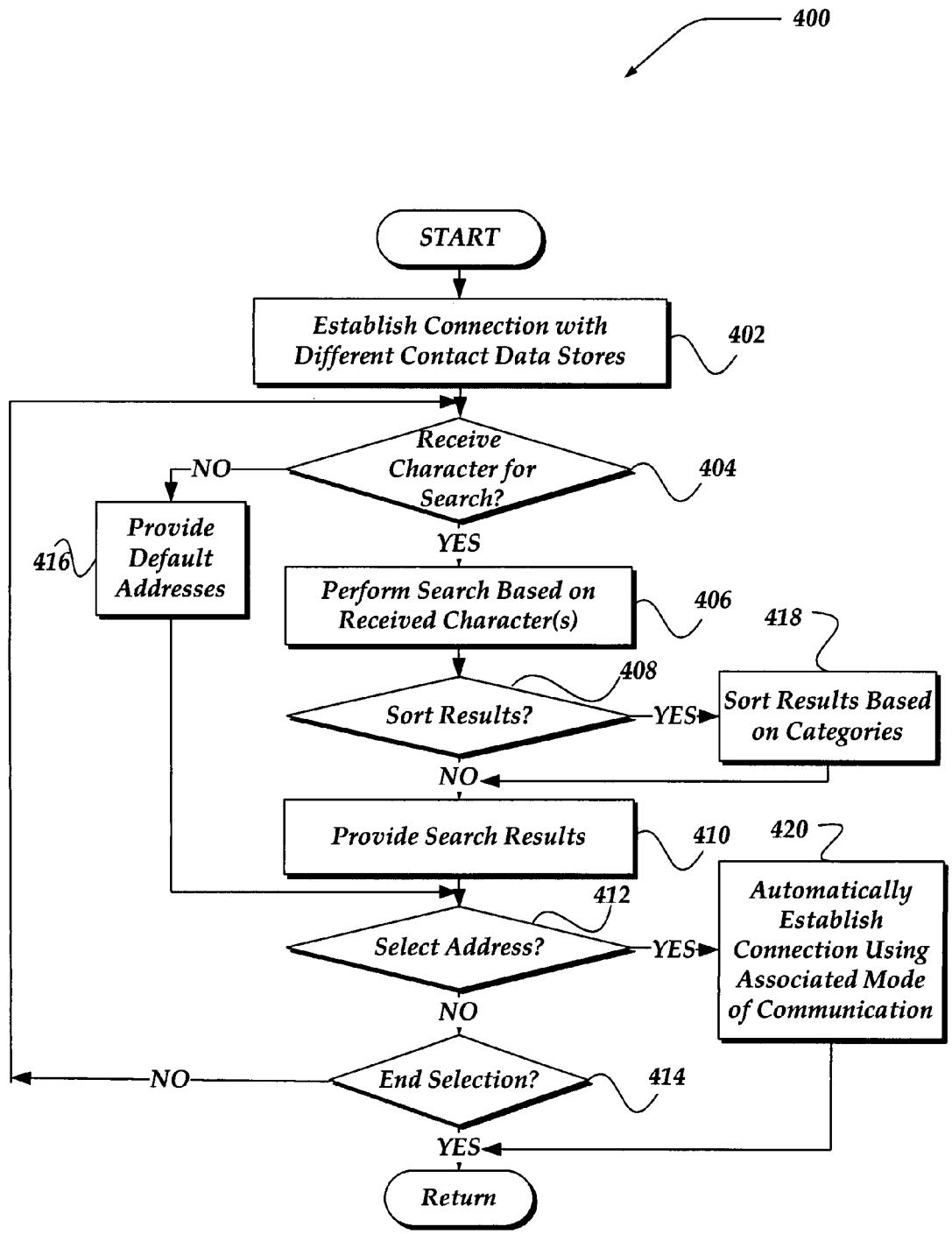
FIG. 4 illustrates a logical flow diagram generally showing one embodiment of a process for performing a federated search and category presentation for a mobile device.

The operation of certain aspects of the invention will now be described with respect to FIG. 4. FIG. 4 illustrates a logical flow diagram generally showing one embodiment of a process for performing a federated search and category presentation for a mobile device. Process 400 of FIG. 4 may be implemented, for example, within CSS 106 of FIG. 1.

As shown in FIG. 4, process 400 begins, after a start block, at block 402, where connections may be established between one or more different contact data stores. In one embodiment, the different contact data stores may include a default set of contact data stores. In one embodiment, a mobile device user may select at least a subset of contact data stores from a list of contact data stores in which to perform a search for a contact name and associated address.

Processing then continues to decision block 404, where a determination is made whether a character is received for use in performing a search. If none is received, but, the mobile device user has requested addresses, then processing may flow to block 416; otherwise, processing flows to block 406.

At block 406, in one embodiment, a default list of contact names and addresses may be provided. For example, in one embodiment, the default list may include a list of most recently accessed contact names and/or addresses. In one embodiment, the contact names and addresses may be displayed to the mobile device user organized into categories that identify a contact data store in which the contact name and address is located. In one embodiment, the default set of addresses may include contact names and their associated addresses from a history log, such as an IM history log, a voice history log, an email log, or the like. In another embodiment, the default set of addresses includes all contact names and associated addresses within the contact data stores identified at block 402. However, the invention is not so limited, and other default addresses may also be displayed. Moreover, in one embodiment, the default set of addresses may be an empty set—that is, no contact names and addresses might be displayed. Processing then flows to decision block 412.

At block 406, a search is performed across the identified contact data stores for a match of the received character(s). Matching of the received character(s) may be based on a variety of mechanisms. For example a match may be based on a first character match in a contact name, an address, or the like. Similarly, a match may be based on a character within an address. For example, where the address is a telephone number, the search might ignore an area code associated with the address and perform a match search based on characters within a prefix of the telephone number, or the like.

In any event, processing flows next to decision block 408, where a determination is made whether a result of the search is to be sorted. If it is processing flows to block 418; otherwise, processing flows to block 410. In one embodiment, the results might be unsorted and instead be displayed based on an order in which the match is found in the search.

At block 418, the results may be ordered based on a variety of criteria. For example, in one embodiment, the results may be ordered based on which contact data store the result was found, such as is illustrated in FIG. 5. In one embodiment, the results may be further sorted within these categories based on a variety of other criteria. For example, results for a given contact data store category may be sorted alphabetically, by listing those results first that use that contact data store as a preferred mode of communication, or the like. Upon completion of block 418, processing continues to block 410.

At block 410, the search results may be displayed to the user. In one embodiment, the search results may be dynamically revised and displayed when another character is received at decision block 404. In one embodiment, a subset of the results may be displayed to the user. In another embodiment, the display interface may include a mechanism that allows the user to scroll through the displayed results. The display interface may further enable the user to select an address, contact name, or the like from the displayed search results.

Processing continues to decision block 412, where a determination is made whether an address has been selected from the displayed results. For example, the user may select a telephone number, an email address, or the like for a contact name. In any event, if an address is selected, processing flows to block 420; otherwise, process flows to decision block 414.

At block 420, a communication is automatically initiated with the contact name using the selected address using the associated mode of communication for the selected address. Thus, for example, selecting an email address results in a window, frame, or other interface, being automatically displayed for use in preparing and sending an email message to the selected address. In one embodiment, an associated messaging client application may be automatically 'launched' for use by the user. In one embodiment, the selected address and contact name may be automatically entered into a header field, or the like, for the user. The user may then enter additional text, change a header, or the like, and send the communication using the communication medium associated with the selected address. Process 400 then returns to a calling process to perform other actions.

At decision block 414, a determination is made whether to end the federated search process. In one embodiment, this may be determined by the user changing use of interfaces, explicitly terminating the process, or the like. In any event if the process is terminated, the process returns to a calling process to perform other actions. Otherwise, if the process is not terminated, then the process branches back to decision block 404 to receive another character for use in searching the contact data stores. By looping back through decision block 404, the process may receive additional characters for use in the search. Furthermore, although not illustrated, at any point, the user may select to delete one or more of the entered characters. Such deletions may result in a new search being performed based on a remaining character. In one embodiment, when no characters are received, no search might be performed.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

FIG. 5 shows one embodiment of a screen shot illustrating a federated contact data store search and presentation by category of results on a mobile device, in accordance with the present invention. As shown in the figure, interface 500, entered character 502 may result in a display of contact information results 504. Contact information results 504 include contact names and addresses associated with contact names. As illustrated, an entry of the character "S" may result in a search being performed on contact names and/or addresses that may begin with the entered character 602 (the letter "S").

As described above, the results may be sorted based on any of a variety of criteria. For example, contact names and addresses may be categorized based on the contact data stores from which it was found. Thus, as illustrated, contact data stores 506 may show, for example, that a contact name, such as contact names/addresses 516 appears in an email contact data store, name/address 517 appears in an IM contact data store, and name/address appears in a phone directory. Furthermore, as shown, name/addresses 516-517 might be associated with the same person, just entered using different forms of the person's name, alias, or the like.

As shown, the results 504 may be displayed using a drop down interface window 520. However, the invention is not so limited, and the display may also employ a non-drop down interface. In one embodiment, the results may be scrollable using a scroll bar 522, or the like.

Also shown, is an indicator next to a contact name/address indicating that the related mode of communication (IM) is a preferred mode of communication for this contact name. Preferences may be determined based on a variety of criteria, including those described above, based on a frequency of communications from the contact name using one mode of communication over another, or the like.

Also illustrated in interface 500 is one embodiment of a mechanism for defining categories 512, and defining contact data stores 510 with which to perform the federated search. In one embodiment, selection of defining categories 512 may provide a display of various options from which a mobile device user may select, including, but not limited to, alphabetical categories, contact data store categories, addresses categories, or the like.

In one embodiment, selection of defining contact data stores 510 may provide a list of available contact data stores, from which the mobile device user may select. In one embodiment, the mobile device user may be enabled to provide identification of additional contact data stores to be included in the search.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server device to manage a mobile communication, comprising:
   a transceiver to send and receive data over a network; and
   a processor that is operative to perform actions, comprising:
      determining a plurality of contact data stores having at least one contact name and an associated address, each of the contact data stores being associated with a different mode of communication and residing on a different computing device;
      receiving at least one character from a mobile device for use in a search;
      performing a federated search by transmitting a search request to each of the plurality of contact data stores, wherein each search request is based on the at least one character, and wherein each of the searched contact data stores are associated with a different mode of communication;
      displaying, at the mobile device, a plurality of contact names and associated addresses that is based on the federated search and displaying first those contact names and addresses from at least one contact data store that is catalogued and identified by a preferred mode of communication based on a frequency of communication from the contact names using one mode of communication over another mode communication, the displayed contact names and associated addresses being grouped by and displayed within the different modes of communications of the plurality of contact data stores; and
      if a selection of a contact name and an associated address from the displayed list is received, automatically establishing communication with the selected contact name using the associated address.

2. The server device of claim 1, wherein the displayed list further indicates a preferred associated address for the preferred mode of communication for the at least one contact name.

3. The server device of claim 1, wherein the displayed list is further displayed with the preferred mode of communication for a search user being higher on an ordered list of contact names than a non-preferred mode of communication.

4. The server device of claim 1, wherein the modes of communication further comprise at least email, SMS, IM, VoIP, and Phone.

5. The server device of claim 1, wherein the at least one character further comprises a portion of a telephone number, a portion of an email address, a portion of an SMS address, a portion of an IM address, a portion of a contact name from a buddy list, or portion of a contact name.

6. The server device of claim 1, wherein determining the plurality of contact data stores further comprises at least one of employing a default set of contact data stores, employing a set of contact data stores based on a frequency of use by a search user, or enabling a search user to select the plurality of contact data stores.

7. A computer-readable storage medium having computer-executable instructions for sharing of event information over a network, the computer-executable instructions when installed onto a computing device enable the computing device to perform actions comprising:
   determining a plurality of contact data stores, each contact data store being associated with a different mode of communicating over a network and comprising at least one contact name and an associated address, wherein each of the plurality of contact data stores resides on a different computing device;
   in response to receiving from a mobile device at least one character, dynamically repeating a federated search by transmitting a search request to each of the plurality of contact data stores for a match of the at least one character within the at least one contact name or address, wherein each of the searched contact data stores are associated with a different mode of communication; and
   displaying a result of the federated search and displaying first those contact names and addresses from at least one contact data store that is catalogued and identified by a preferred mode of communication based on a frequency of communication from the contact names using one mode of communication over another mode communication, at the mobile device, comprising a dynamic list of a plurality of contact names and addresses organized within categories of the different modes of communication for the plurality of contact data stores.

8. The computer-readable storage medium of claim 7, wherein the actions further comprise:
   receiving a selection of an address from within the displayed result of the search; and
   automatically initiating a communication using a mode of communications associated with the selected address.

9. The computer-readable storage medium of claim 7, wherein displaying the result of the search further comprises displaying at least one matching contact name and associated address with an identifier indicating a preferred mode of communication to use for a contact name.

10. The computer-readable storage medium of claim 7, wherein at least one contact name may be included within more than one contact data store.

11. The computer-readable storage medium of claim 7, wherein dynamically repeating the search further comprises repeating the search based on receiving at least one more character from the mobile device.

12. The computer-readable storage medium of claim 7, wherein determining a plurality of contact data stores further comprises enabling a user of the mobile device to select from a list of contact data stores.

13. The computer-readable storage medium of claim 7, wherein dynamically repeating a search further comprises performing an auto-completion of characters employable in performing the search, based in part, on the result of the search.

14. A mobile device for sharing information, comprising:
a memory component for storing data; and
a processing component for executing data that enables actions, comprising:
determining a plurality of contact data stores having at least one contact name and an associated address, each of the contact data stores being associated with a different mode of communication, wherein each of the plurality of contact data stores resides on a different computing device;
sending, to a server, at least one character for use in a search;
displaying a list of contact names and associated addresses based on a federated search performed by transmitting a search request to each of the determined plurality of contact data stores, the displayed contact names and associated addresses being displayed in an order and grouping that is based on categories of the different modes of communication determined from the determined plurality contact data stores and displaying first those contact names and addresses from at least one contact data store that is catalogued and identified by a preferred mode of communication based on a frequency of communication from the contact names using one mode of communication over another mode communication, wherein each of the searched contact data stores are associated with a different mode of communication; and
sending a selection of a contact name and an associated address from the displayed list is received, to automatically establish a communication with the selected contact name using the associated address.

15. The mobile device of claim 14, wherein determining a plurality of contact data stores further comprises enabling a user of the mobile device to select from a list of contact data stores, or employing a default list of contact data stores.

16. The mobile device of claim 14, wherein sending at least one character further comprises sending at least one character associated with at least one of a telephone number, an email address, an alias, a contact name, an SMS address, or an IM address.

17. A method operating within a network computer device for managing a mobile communication, comprising:
determining a plurality of contact data stores, each contact data store being associated with a different mode of communicating over a network and comprising at least one contact name and an associated address, and wherein each of the plurality of contact data stores resides on a different computing device;
in response to receiving from a mobile device at least one character for use in performing a federated search, dynamically transmitting a search request to each of the determined plurality of contact data stores for a match of the at least one character, wherein each of the searched contact data stores are associated with a different mode of communication; and
displaying a result of the search and displaying first those contact names and addresses from at least one contact data store that is catalogued and identified by a preferred mode of communication based on a frequency of communication from the contact names using one mode of communication over another mode communication, at the mobile device, wherein the result is a dynamic list of a plurality of contact names and addresses grouped based on categories of the different modes of communication of the plurality of contact data stores.

18. The method of claim 17, wherein displaying the result further comprises displaying an identifier next to at least one of a contact name or an address indicating a mode of communication more frequently used to receive a message from that contact name.

19. The method of claim 17, wherein the displayed list is further displayed with the at least one preferred mode of communication for a search user being displayed higher on the list than a non-preferred mode of communication.

20. The method of claim 17, wherein the modes of communication further comprise at least email, SMS, IM, VoIP, and Phone.

21. The method of claim 17, wherein a computer-readable storage media is configured to include program instructions for performing the method of claim 17.

22. An apparatus to manage a mobile communication, comprising:
a transceiver to send and receive data over a network;
means for determining a plurality of contact data stores for use in performing a mobile device requested search, each contact data store being associated with a different mode of communication including at least two of email, SMS, IM, VoIP, and Phone, wherein each of the plurality of contact data stores resides on a different computing device;
means for automatically determining at least one contact name and address for a display from the plurality of contact data stores based on a partially entered contact name or address by at least performing a federated search by transmitting a search request to each of the plurality of contact data stores being associated with a different mode of communication; and
means for displaying at a mobile device the results of the automatic determination and displaying first those contact names and addresses from at least one contact data store that is catalogued and identified by a preferred mode of communication based on a frequency of communication from the contact names using one mode of communication over another mode communication, the results being organized by categories of modes of communication that identify the determined plurality of contact data stores from which each result item is obtained.

* * * * *